US012082214B2

(12) United States Patent
Lin et al.

(10) Patent No.: US 12,082,214 B2
(45) Date of Patent: Sep. 3, 2024

(54) MULTI-SLOT PDCCH MONITORING FRAMEWORK

(71) Applicant: MediaTek Singapore Pte. Ltd., Singapore (SG)

(72) Inventors: Hsien-Ping Lin, San Jose, CA (US); Jiann-Ching Guey, Hsinchu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 171 days.

(21) Appl. No.: 17/690,095

(22) Filed: Mar. 9, 2022

(65) Prior Publication Data

US 2022/0330310 A1 Oct. 13, 2022

Related U.S. Application Data

(60) Provisional application No. 63/279,710, filed on Nov. 16, 2021, provisional application No. 63/250,284, filed on Sep. 30, 2021, provisional application No. 63/171,631, filed on Apr. 7, 2021.

(51) Int. Cl.
*H04W 72/10* (2009.01)
*H04L 25/02* (2006.01)
*H04W 72/23* (2023.01)

(52) U.S. Cl.
CPC ......... *H04W 72/23* (2023.01); *H04L 25/0238* (2013.01)

(58) Field of Classification Search
CPC .......................... H04W 72/23; H04L 25/0238
See application file for complete search history.

(56) References Cited

U.S. PATENT DOCUMENTS

| 2018/0302254 | A1 | 10/2018 | Yamada et al. |
| 2021/0037502 | A1 | 2/2021 | Tsai et al. |
| 2023/0189305 | A1* | 6/2023 | Oteri ..................... H04L 5/0053 |

OTHER PUBLICATIONS

Taiwan Patent Office, "Office Action", Jul. 14, 2022, Taiwan.

* cited by examiner

*Primary Examiner* — Ronald B Abelson
(74) *Attorney, Agent, or Firm* — Locke Lord LLP; Tim Tingkang Xia, Esq.

(57) ABSTRACT

The UE allocates a slot group including a number of consecutive slots based on an operating subcarrier spacing. The UE receives a configuration allocating blind detections over non-overlapping CCEs in the slot group among a group of component carriers of the UE using the operating subcarrier spacing. The UE performs, in the slot group, a next set of blind detections over a next set of non-overlapping CCEs on a given component carrier of the group of component carriers in accordance with the configuration, when (a) a total number of blind detections that would have been performed in the slot group by the UE does not exceed a limit of total blind detections and (b) a total number of non-overlapping CCEs that would have been monitored in the slot group by the UE does not exceed a limit of total non-overlapping CCEs.

20 Claims, 12 Drawing Sheets

MULTI-SLOT PDCCH MONITORING FRAMEWORK

CROSS-REFERENCE TO RELATED APPLICATION(S)

This application claims the benefits of U.S. Provisional Application Ser. No. 63/171,631, entitled "UE PDCCH MULTI-SLOT MONITORING CAPABILITY FOR SINGLE-CELL AND MULTI-CELL OPERATION IN 52.6-71 GHZ" and filed on Apr. 7, 2021; U.S. Provisional Application Ser. No. 63/250,284, entitled "MULTI-SLOT PDCCH MONITORING FRAMEWORK" and filed on Sep. 30, 2021; and U.S. Provisional Application Ser. No. 63/279,710, entitled "TYPE 1 CSS WITH DEDICATED RRC CONFIGURATION, TYPE 3 CSS, AND UE-SS MONITORING CAPABILITY IN MULTI-SLOT PDCCH MONITORING" and filed on Nov. 16, 2021; all of which are expressly incorporated by reference herein in their entirety.

BACKGROUND

Field

The present disclosure relates generally to communication systems, and more particularly, to techniques of performing blind detections at a user equipment (UE).

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a base station. The base station allocates a slot group including a number of consecutive slots based on an operating subcarrier spacing. A start boundary and an end boundary of the slot group each align with a boundary of a slot using a reference subcarrier spacing. The base station determines a limit of total blind detections in the slot group to be performed by a user equipment (UE) and a limit of total non-overlapping control-channel elements (CCEs) being monitored by the UE, both associated with the operating subcarrier spacing. The base station transmits a configuration allocating P blind detections over M non-overlapping CCEs in the slot group among a group of component carriers of the UE using the operating subcarrier spacing, P being an integer not greater than the limit of total blind detections, M being an integer not greater than the limit of total non-overlapping CCEs.

In another aspect of the disclosure, a method, a computer-readable medium, and an apparatus are provided. The apparatus may be a UE. The UE allocates a slot group including a number of consecutive slots based on an operating subcarrier spacing. A start boundary and an end boundary of the slot group each align with a boundary of a slot using a reference subcarrier spacing. The UE receives a configuration allocating blind detections over non-overlapping CCEs in the slot group among a group of component carriers of the UE using the operating subcarrier spacing. The UE performs, in the slot group, a next set of blind detections over a next set of non-overlapping CCEs on a given component carrier of the group of component carriers in accordance with the configuration, when (a) a total number of blind detections, including the next set of blind detections, that would have been performed in the slot group by the UE on the group of component carriers does not exceed a limit of total blind detections associated with the operating subcarrier spacing and (b) a total number of non-overlapping CCEs, including the next set of non-overlapping CCEs, that would have been monitored in the slot group by the UE on the group of component carriers does not exceed a limit of total non-overlapping CCEs associated with the operating subcarrier spacing.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
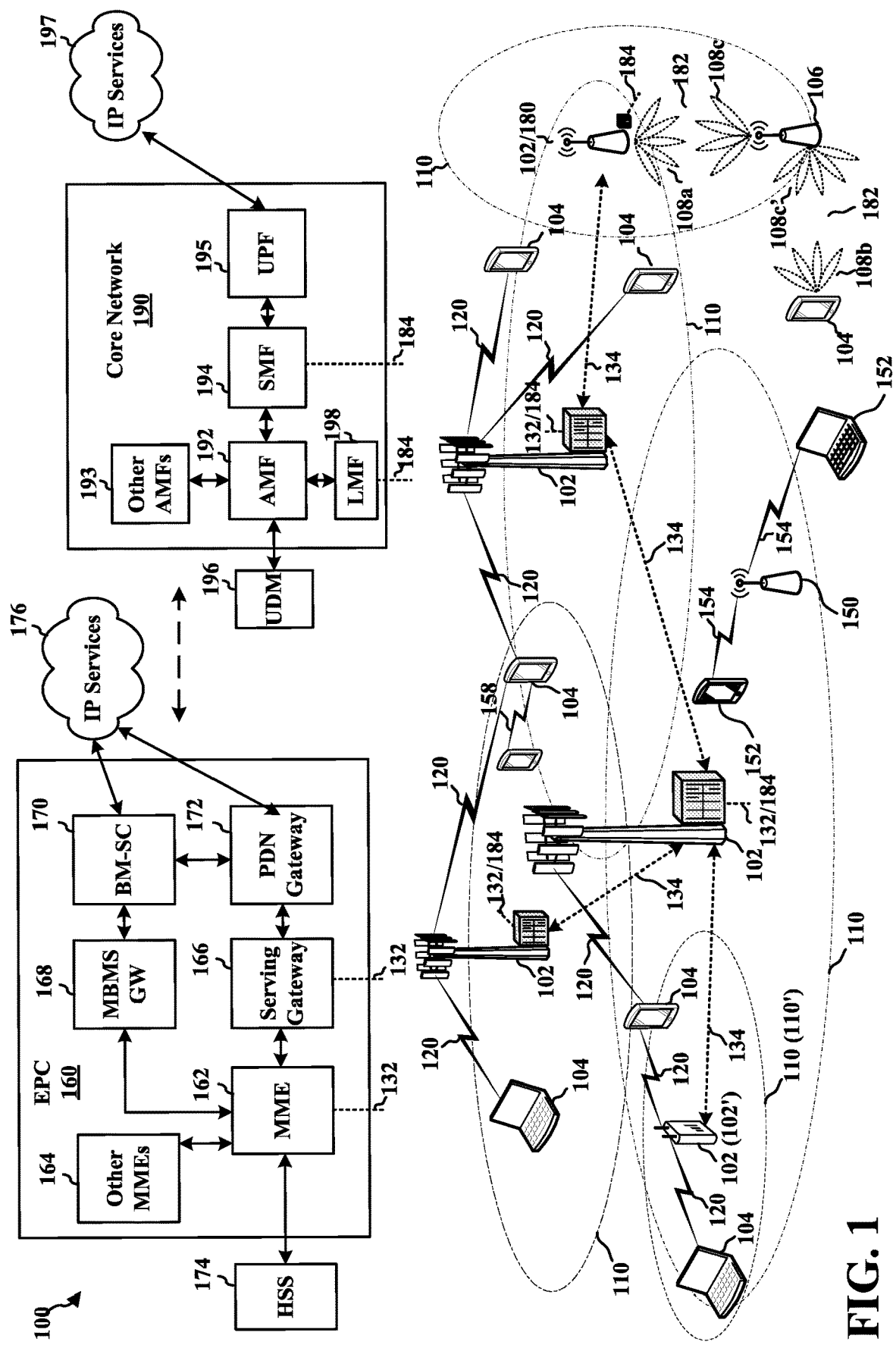
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
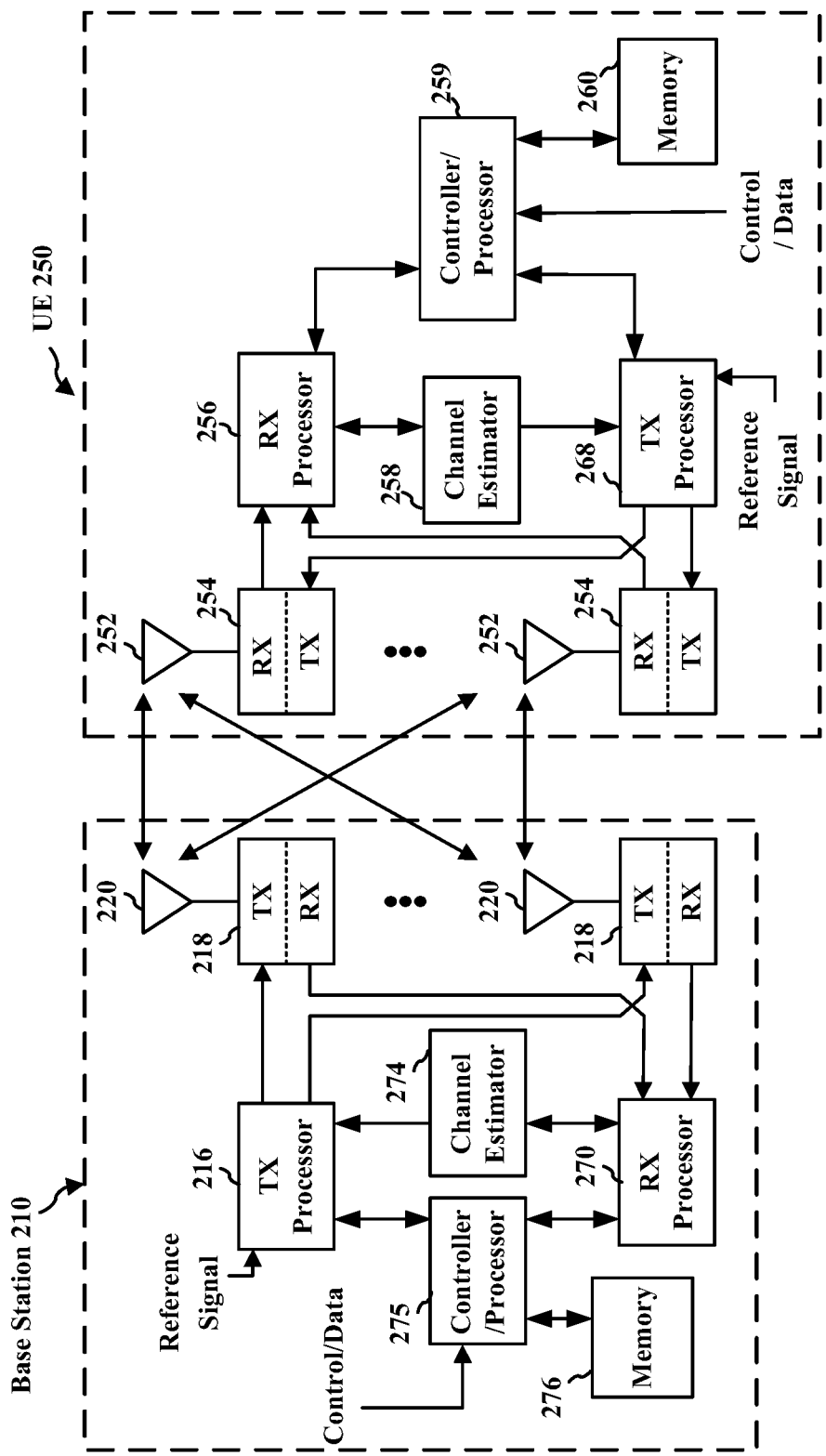
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.125 ms duration or a bandwidth of 15 kHz over a 0.5 ms duration. Each radio frame may consist of 20 or 80 subframes (or NR slots) with a length of 10 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
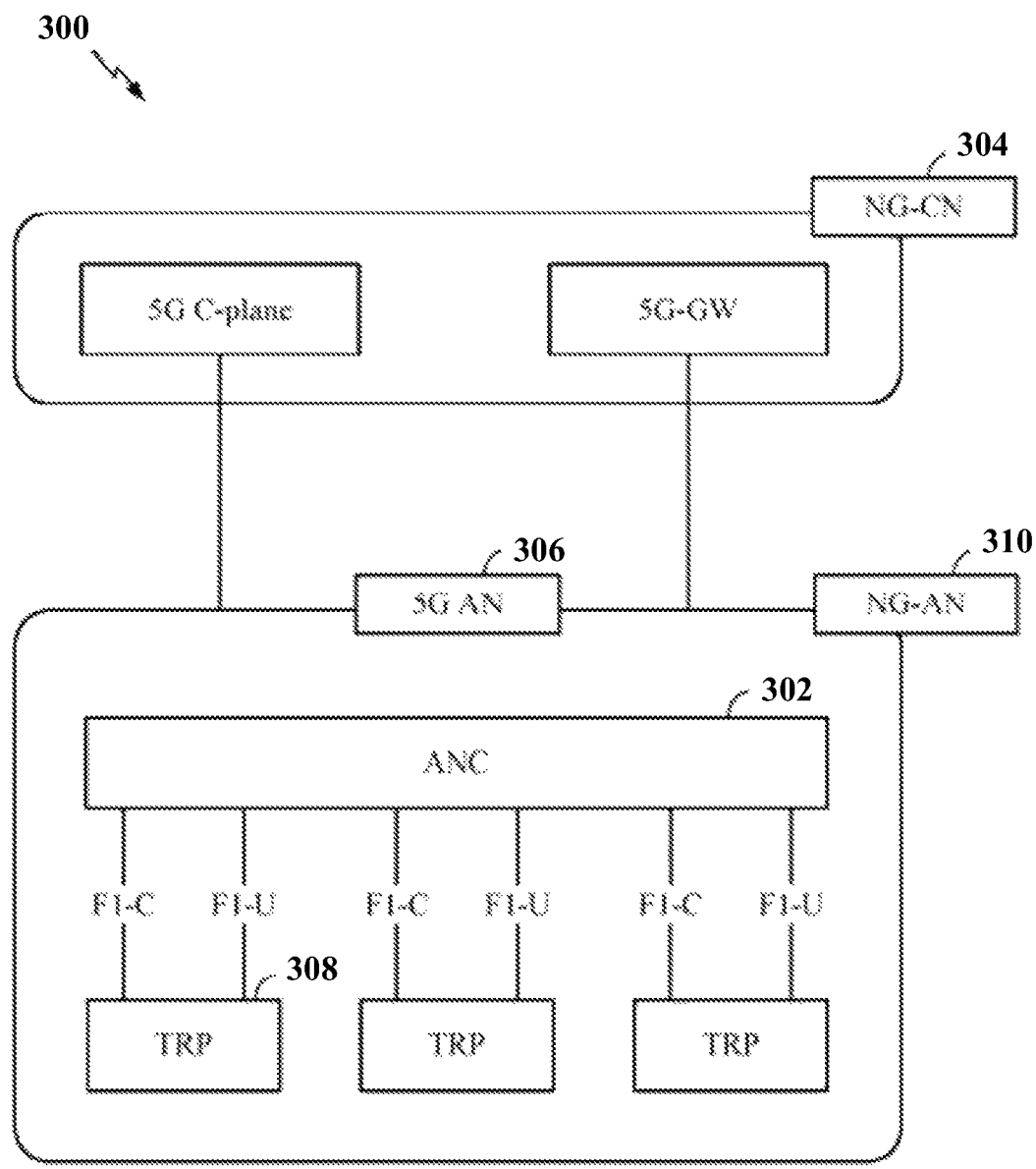
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
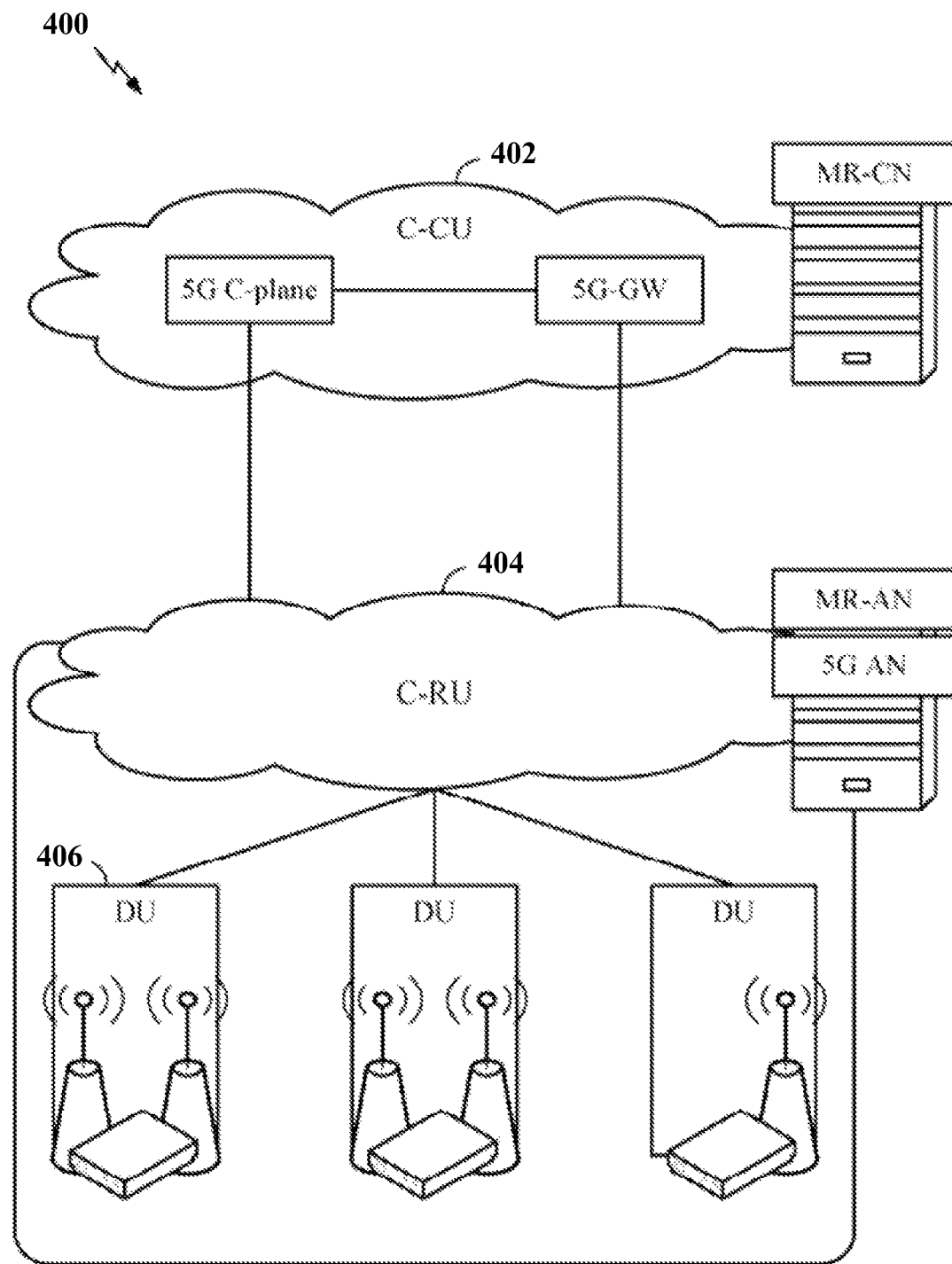
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
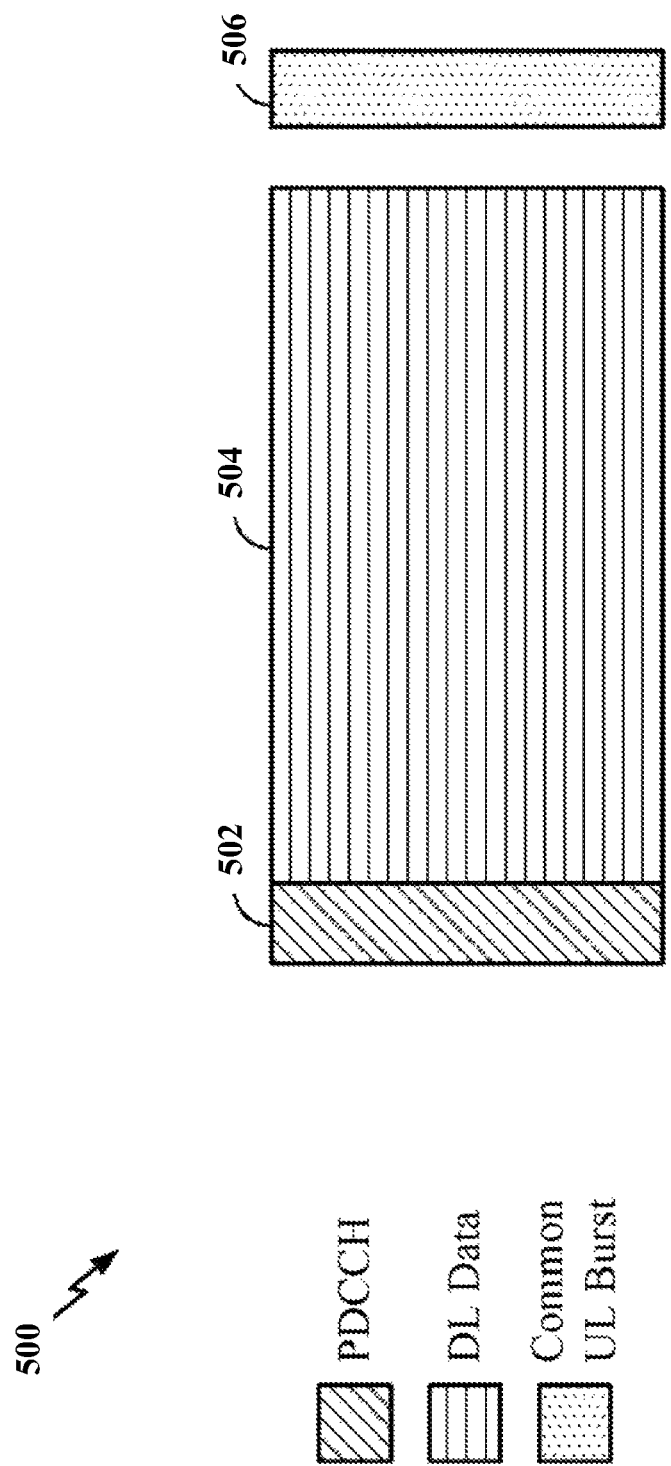
FIG. 5 is a diagram showing an example of a DL-centric subframe.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6:
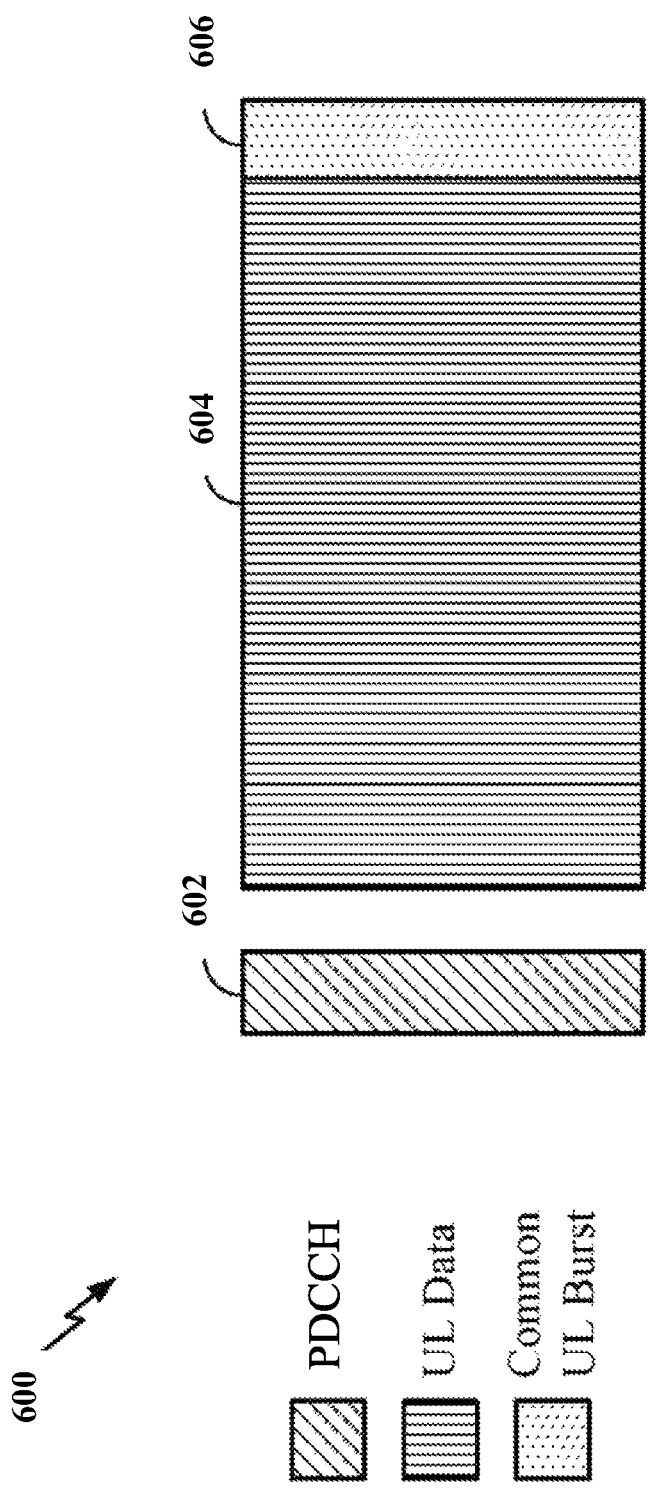
FIG. 6 is a diagram showing an example of an UL-centric subframe.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
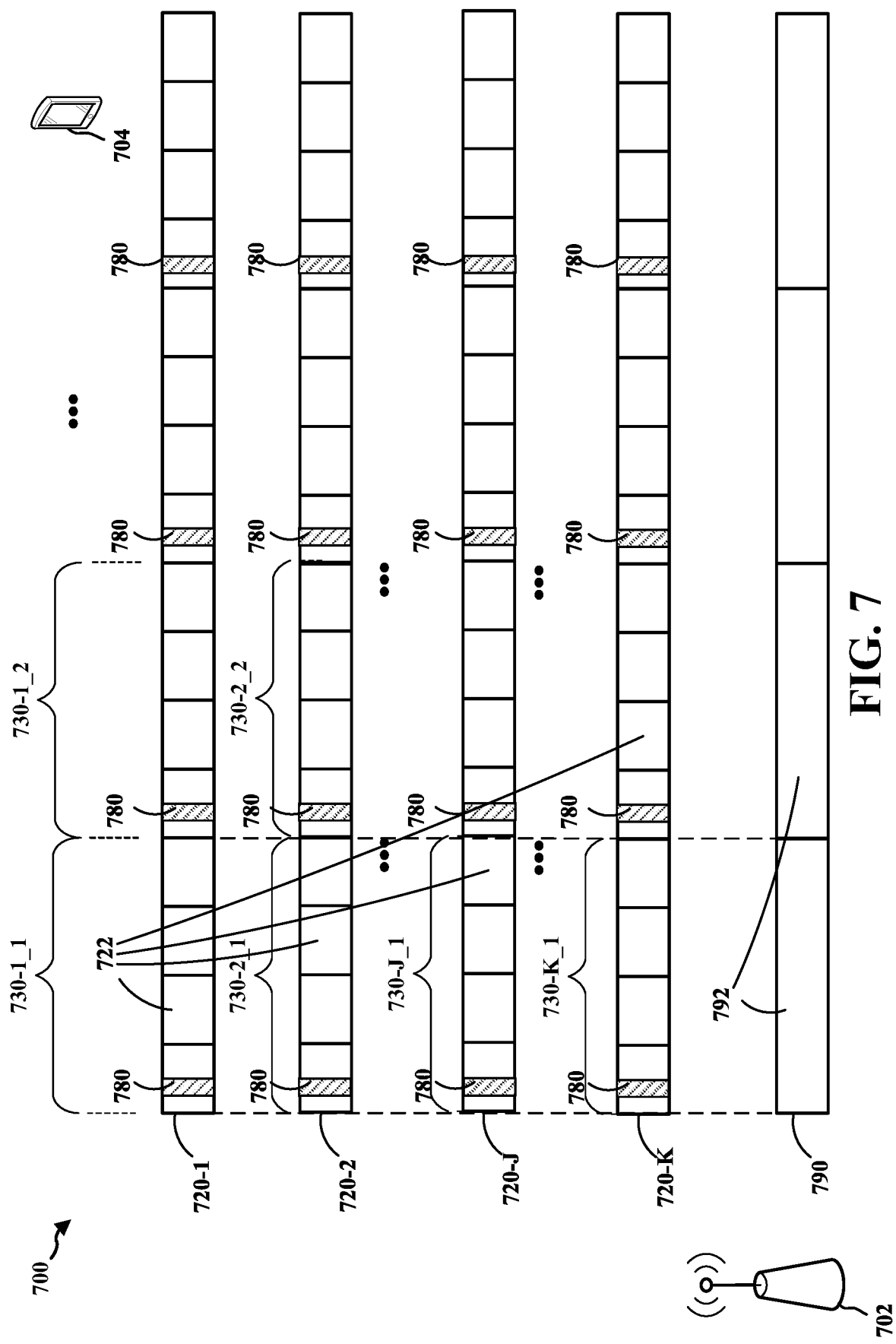
FIG. 7 is a diagram illustrating communications between a base station and a UE.

FIG. 7 is a diagram 700 illustrating communication between a base station 702 and a UE 704. The base station 702 may establish component carriers 720-1, 720-2, . . . , 720-J, . . . , 720-K with the UE 704. K is an integer greater than 1. FIG. 7 also shows a reference carrier 790, which, in this example, has a numerology of 120 kHz (i.e., using a reference subcarrier spacing of 120 kHz). The component carriers 720-1, 720-2, . . . , 720-J, . . . , 720-K each may have a numerology (e.g., 480 kHz, 960 kHz) higher than that of the reference carrier 790. In this example, the component carriers 720-1, 720-2, . . . , 720-J, . . . , 720-K has a numerology of 480 kHz. In another example, the numerologies of different component carriers may be different.

The base station 702 allocates slots 722 on the component carriers 720-1, 720-2, . . . , 720-J, . . . , 720-K. Further, the base station 702 divides the slots 722 on each component carrier into consecutive slot groups. For example, the slots 722 on the component carrier 720-1 can be divided into slot groups 730-1_1, 730-1_2, etc. In certain configurations, each slot group contains a configured number of consecutive slots based on the subcarrier spacing of the component carrier. In this example, where the subcarrier spacing is 480 kHz, a slot group contains 4 slots. In another example, where the subcarrier spacing is 960 kHz, a slot group contains 8 slots.

In certain configurations, the base station 702 determines the boundaries of a slot group in accordance with boundaries of a slot of a reference carrier. In this example, the base station 702 may determine the slot group boundaries based on the reference carrier 790, which would be allocated reference slots 792. For example, the base station 702 aligns the start boundary of the slot group 730-1_1 with the start boundary of a reference slot 792, and also aligns the end boundary of the slot group 730-1_1 with the end boundary of that same reference slot 792.

Similarly, the base station 702 can divide slots on other component carriers into slot groups. In certain configurations, the slot groups on each component carrier are allocated according to the same pattern. In this example, a slot group 730-2_1 on the component carrier 720-2 . . . , a slot group 730-J_1 on the component carrier 720-J, and a slot group 730-K_1 on the component carrier 720-K have the same start boundary and end boundary as those of the slot group 730-1_1 on the component carrier 720-1, and are aligned with the same reference slot 792 on the reference carrier 790.

The UE 704 may report its capability for carrier aggregation (CA) and its capability for blind detections and CCE monitoring to the base station 702. For example, the UE 704 can report that it supports a maximum of $N_{cell}^{CAP}$ component carriers in CA. In a first technique, the UE 704 also reports that it can perform a maximum of $P_{PDCCH}^{slot\_group,(X,Y),\mu}$ blind detections and monitor a maximum of $M_{PDCCH}^{max,slot\_group,(X,Y),\mu}$ CCEs on a single component carrier having a numerology corresponding to µ in a slot group (e.g., the slot group 730-1_1) corresponding to (X, Y). X denotes the number of consecutive slots in a slot group, and Y denotes the number of consecutive slots in which a UE will monitor PDCCH within a slot group. In particular, the CCEs may be non-overlapping CCEs. $\mu$ is determined according to that the subcarrier spacing of the component carriers is $15 \times 2^\mu$ kHz. For example, when the subcarrier spacing is 480 kHz, $\mu$ is 5. Each component carrier may have its own PDCCH monitoring configuration corresponding to (X, Y, $\mu$).

In a second technique, the UE 704 also reports that it can perform a maximum of $P_{PDCCH}^{slot\_group,X,\mu}$ blind detections and monitor a maximum of $M_{PDCCH}^{max,slot\_group,X,\mu}$ CCEs on a single component carrier having a numerology corresponding to $\mu$ in a slot group (e.g., the slot group 730-1_1) corresponding to X, regardless of Y.

The base station 702 may send to the UE 704 a configuration for scheduling monitoring $N_{cell}^{DL}$ component carriers. In a first scenario, $N_{cell}^{DL}$ is not greater than $N_{cell}^{CAP}$, and thus the configuration is under the CA capability of the UE 704. Using the first technique, the UE 704 is limited to monitor up to $M_{PDCCH}^{max,slot\_group,(X,Y),\mu}$ CCEs and perform up to $P_{PDCCH}^{slot\_group,(X,Y),\mu}$ blind detections on a component carrier having a numerology corresponding to $\mu$ in one slot group corresponding to (X, Y) (i.e., the component carrier associated with (X, Y, $\mu$)). In one example, $N_{cell}^{CAP}$ equals to K, and $N_{cell}^{DL}$ equals to J. Accordingly, the UE 704 can monitor up to $M_{PDCCH}^{max,slot\_group,(X,Y),\mu} \times N_{cell}^{DL,(X,Y),\mu}$ CCEs and perform up to $P_{PDCCH}^{slot\_group,(X,Y),\mu} \times N_{cell}^{DL,(X,Y),\mu}$ blind detections over those CCEs across all component carriers associated with (X, Y, $\mu$) scheduled in one set of aligned slot groups (e.g., the slot group 730-1_1, the slot group 730-2_1, ..., and/or the slot group 730-J_1). $N_{cell}^{DL,(X,Y),\mu}$ is the number of component carriers associated with (X, Y, $\mu$) in the $N_{cell}^{DL}$ component carriers.

In a second scenario, $N_{cell}^{DL}$ is greater than $N_{cell}^{CAP}$. That is, the number of cells configured for PDCCH monitoring is beyond the CA capability of the UE. In one example, $N_{cell}^{CAP}$ equals to J, and $N_{cell}^{DL}$ equals to K. Using the first technique, both the base station 702 and the UE 704 can determine that the UE 704 can monitor up to $M_{PDCCH}^{max,slot\_group,(X,Y),\mu} \times N_{cell}^{DL,(X,Y),\mu} \times N_{cell}^{CAP}/N_{cell}^{DL}$ CCEs and perform up to $P_{PDCCH}^{slot\_group,(X,Y),\mu} \times N_{cell}^{DL,(X,Y),\mu} \times N_{cell}^{CAP}/N_{cell}^{DL}$ blind detections across all component carriers associated with (X, Y, $\mu$) scheduled in one set of aligned slot groups (e.g., the slot group 730-1_1, the slot group 730-2_1, ..., and/or the slot group 730-K_1). $N_{cell}^{CAP}/N_{cell}^{DL}$ is a down-scale ratio used to accommodate that $N_{cell}^{DL}$ is greater than $N_{cell}^{CAP}$ In this example of the second scenario and using the first technique, upon receiving the blind detection/CCE configurations from the base station 702, the UE 704 starts to perform blind detections according to the blind detection configuration. Prior to performing a next set of blind detections over a next set CCEs on a given component carrier associated with (X, Y, $\mu$), the UE 704 determines whether the limit of total blind detections being performed, the limit of total CCEs being monitored, the limit of blind detections being performed per component carrier, or the limit of CCEs being monitored per component carrier, all of which are associated with (X, Y, $\mu$), would be exceeded if the next set of blind detections is performed over the next set of CCEs. If one of the limits would be exceeded, the UE 704 drop one or more subsets of blind detections from the set of blind detections until performing the blind detections remaining in the set would not cause any limit to be exceeded. The UE 704 then performs the remaining bind detections (i.e., the non-dropped blind detections), if any.

In the second scenario and using the second technique, the base station 702 and the UE 704 can determine that the UE 704 can monitor up to $M_{PDCCH}^{max,slot\_group,X,\mu} \times N_{cell}^{DL,X,\mu} \times N_{cell}^{CAP}/N_{cell}^{DL}$ CCEs and perform up to $P_{PDCCH}^{slot\_group,X,\mu} \times N_{cell}^{DL,X,\mu} \times N_{cell}^{CAP}/N_{cell}^{DL}$ blind detections across all component carriers associated with (X, $\mu$) scheduled in one set of aligned slot groups (e.g., the slot group 730-1_1, the slot group 730-2_1, ..., and/or the slot group 730-K_1). $N_{cell}^{CAP}/N_{cell}^{DL}$ is a down-scale ratio used to accommodate that $N_{cell}^{DL}$ is greater than $N_{cell}^{CAP}$. $N_{cell}^{DL,X,\mu}$ is the number of component carriers associated with (X, $\mu$), regardless of Y, in the $N_{cell}^{DL}$ component carriers.

In one illustrating example using the first technique, $N_{cell}^{CAP}$ equals to J, and $N_{cell}^{DL}$ equals to K. At a time point, the UE 704 may be scheduled to perform a next set of blind detections over a next set of CCEs on the component carrier 720-K, which is associated with (4, 1, 5) (i.e., values of (X, Y, $\mu$)) in the slot group 730-K_1. The UE 704 may determine whether the total blind detections that would have been performed by the UE 704 after performing the next set of blind detections, across all component carriers associated with (4, 1, 5) in slot groups aligned with the slot group 730-K_1 (i.e., slot group 730-1_1, ..., slot group 730-K_1), exceeds the limit of $P_{PDCCH}^{slot\_group,(4,1),5} \times N_{cell}^{DL,(4,1),5} \times J/K$. If the limit is exceeded, then the UE 704 may drop one or more subsets of blind detections from the set until the total blind detections would not exceed the limit.

At this time point, the UE 704 may also determine whether the total CCEs that would have been monitored by the UE 704 after performing the next set of blind detections, across all component carriers associated with (4, 1, 5) in slot groups aligned with the slot group 730-K_1 (i.e., slot group 730-1_1, ..., slot group 730-K_1), exceeds the limit of $M_{PDCCH}^{max,slot\_group,(4,1),5} \times N_{cell}^{DL,(4,1),5} \times J/K$. If the limit is exceeded, then the UE 704 may drop one or more subsets of blind detections from the set until the total CCEs would not exceed the limit.

At this time point, the UE 704 may also determine whether the number of blind detections that would have been performed by the UE 704 after performing the next set of blind detections, in the slot group 730-K_1 on the component carrier 720-K, exceeds the limit of $P_{PDCCH}^{slot\_group,(4,1),5}$. If the limit is exceeded, then the UE 704 may drop one or more subsets of blind detections from the set until the number of blind detections would not exceed the limit.

The UE 704 may also determine whether the number of CCEs that would have been monitored by the UE 704 after performing the next set of blind detections, in the slot group 730-K_1 on the component carrier 720-K, exceeds the limit of $M_{PDCCH}^{max,slot\_group,(4,1),5}$. If the limit is exceeded, then the UE 704 may drop one or more subsets of blind detections from the set until the number of CCEs would not exceed the limit.

In this example, when all limits associated with (4, 1, 5) described supra are not exceeded, the UE 704 performs the remaining blind detection in the slot group 730-K_1 on the component carrier 720-K as scheduled by the blind detection configuration.

Further, base station 702 may send a RRC configuration to the UE 704 to configure search spaces 780 in each component carrier of the component carriers 720-1, 720-2, ..., 720-J, ..., 720-K. In particular, the search spaces may be type 1 common search spaces (CSS), type 3 CSS, and type 3 UE search spaces (UE-SS). The blind detections described supra may be performed over CCEs within the configured search spaces 780.

In certain configurations, the base station 702 may configure the search spaces 780 at the same location within each slot group. Using the component carrier 720-1 as an example, the base station 702 may configure the search spaces 780 at the same location within the first slot of each of the slot groups 730-1_1, 730-1_2, etc.

The base station 702 can configure up to a predetermined number of DCI messages in the search spaces of each of the slot groups according to the subcarrier spacing of the component carrier. In certain configurations, the base station 702 can configure up to one DCI message in a slot group of a component carrier having a subcarrier spacing of 120 kHz, 480 kHz, or 960 kHz.

Figure 8:
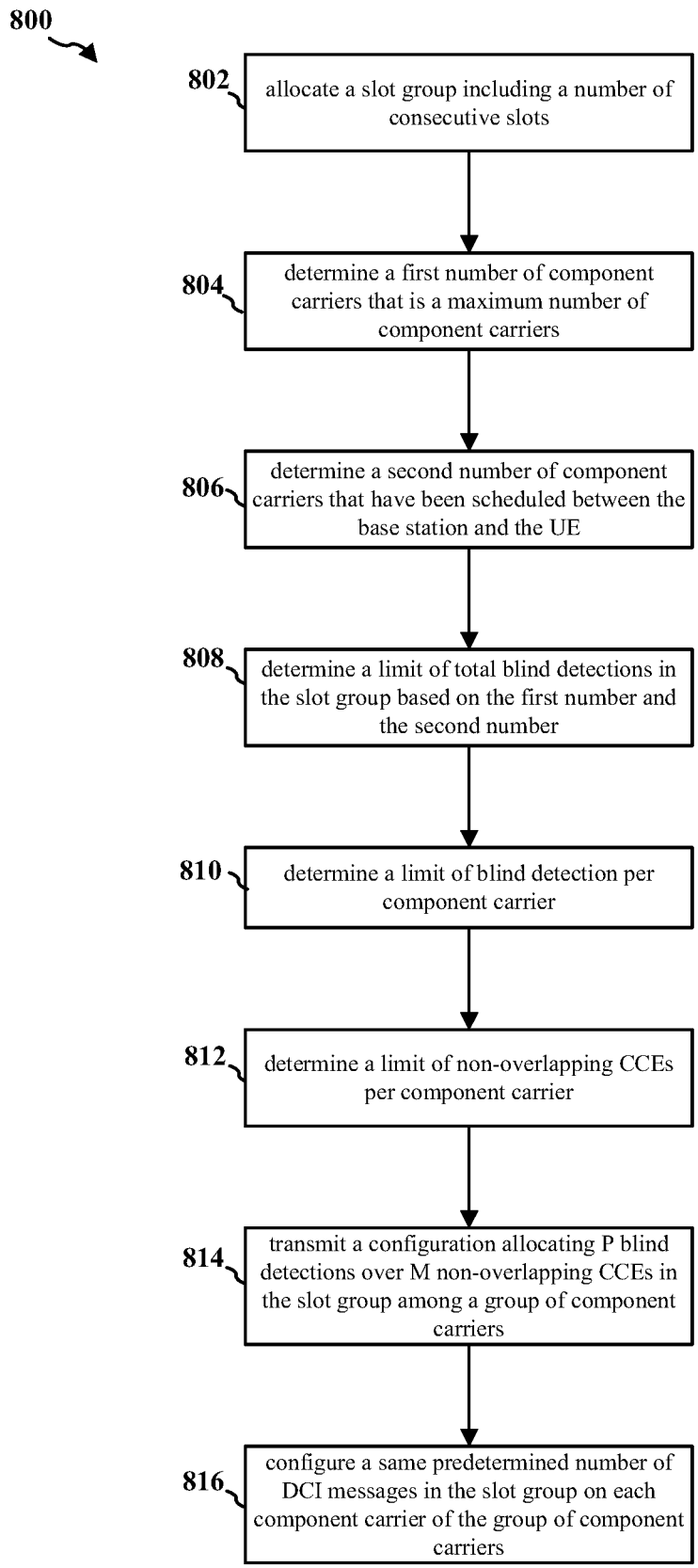
FIG. 8 is a flow chart 800 of a method (process) for configuring blind detections.

FIG. 8 is a flow chart 800 of a method (process) for configuring blind detections. The method may be performed by a base station (e.g., the base station 702). At operation 802, the base station allocates a slot group including a number of consecutive slots based on an operating subcarrier spacing. A start boundary and an end boundary of the slot group each align with a boundary of a slot using a reference subcarrier spacing. At operation 804, the base station determines a first number of component carriers that is a maximum number of component carriers configured for the UE in carrier aggregation. At operation 806, the base station determines a second number of component carriers that have been scheduled between the base station and the UE.

At operation 808, the base station determines a limit of total blind detections in the slot group to be performed by a UE and a limit of total non-overlapping CCEs being monitored by the UE, both associated with the operating subcarrier spacing based on the first number and the second number. At operation 810, the base station determines a limit of blind detection per component carrier using the operating subcarrier spacing for the UE to perform blind detections. At operation 812, the base station determines a limit of non-overlapping CCEs per component carrier using the operating subcarrier spacing for the UE to perform blind detections.

At operation 814, the base station transmits a configuration allocating P blind detections over M non-overlapping CCEs in the slot group among a group of component carriers of the UE using the operating subcarrier spacing. P is an integer not greater than the limit of total blind detections. M is an integer not greater than the limit of total non-overlapping CCEs. The P blind detections in the slot group are allocated among the group of component carriers based on the limit of total blind detections and the limit of blind detection per component carrier using the operating subcarrier spacing. The M non-overlapping CCEs in the slot group are allocated among the group of component carriers based on the limit of total non-overlapping CCEs and the limit of non-overlapping CCEs per component carrier using the operating subcarrier spacing.

In certain configurations, the start boundary of the slot group aligns with a start boundary of a reference slot using the reference subcarrier spacing and the end boundary of the slot group aligns with an end boundary of the reference slot. In certain configurations, the same slot group is allocated on each component carrier of the group of component carriers. At operation 816, the base station configures a same predetermined number of DCI messages in the slot group on each component carrier of the group of component carriers.

Figure 9A:
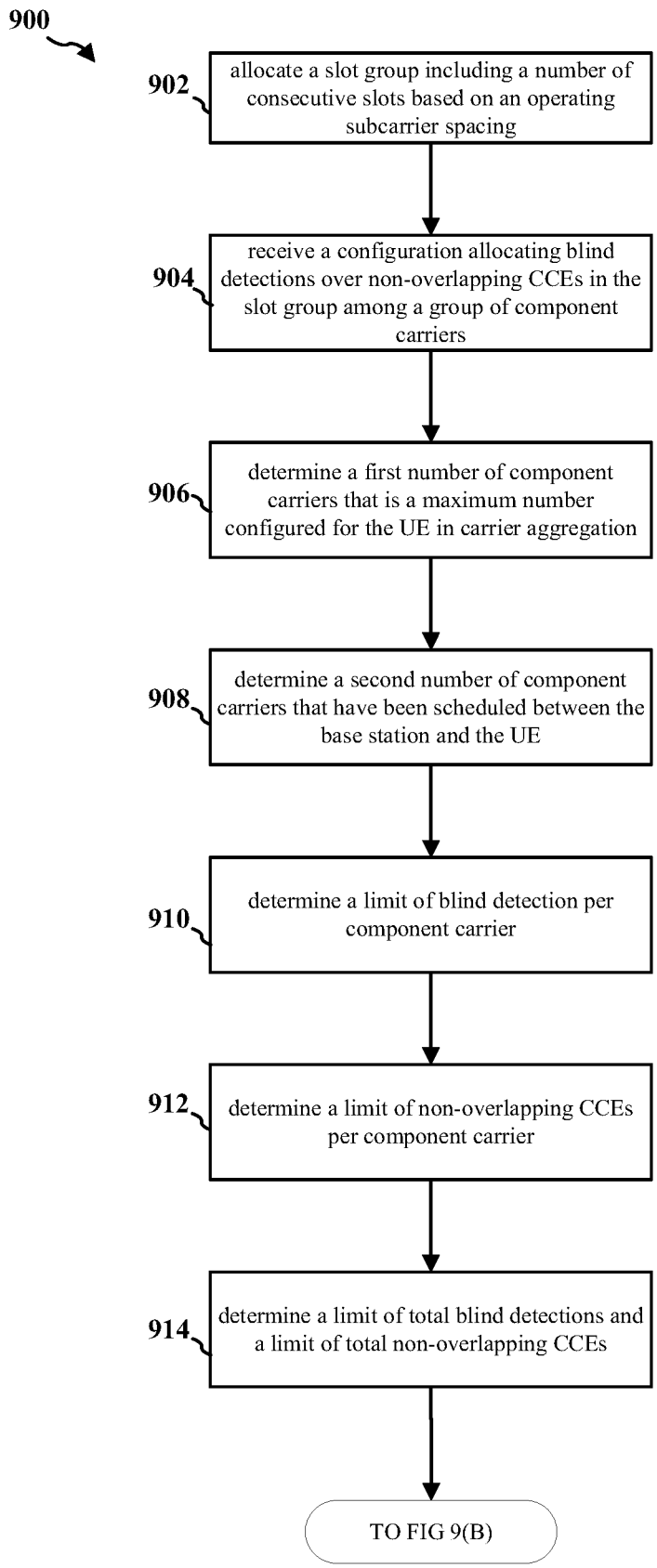
FIGS. 9(A) and 9(B) are a flow chart 900 of a method (process) for performing blind detections.
Figure 9B:
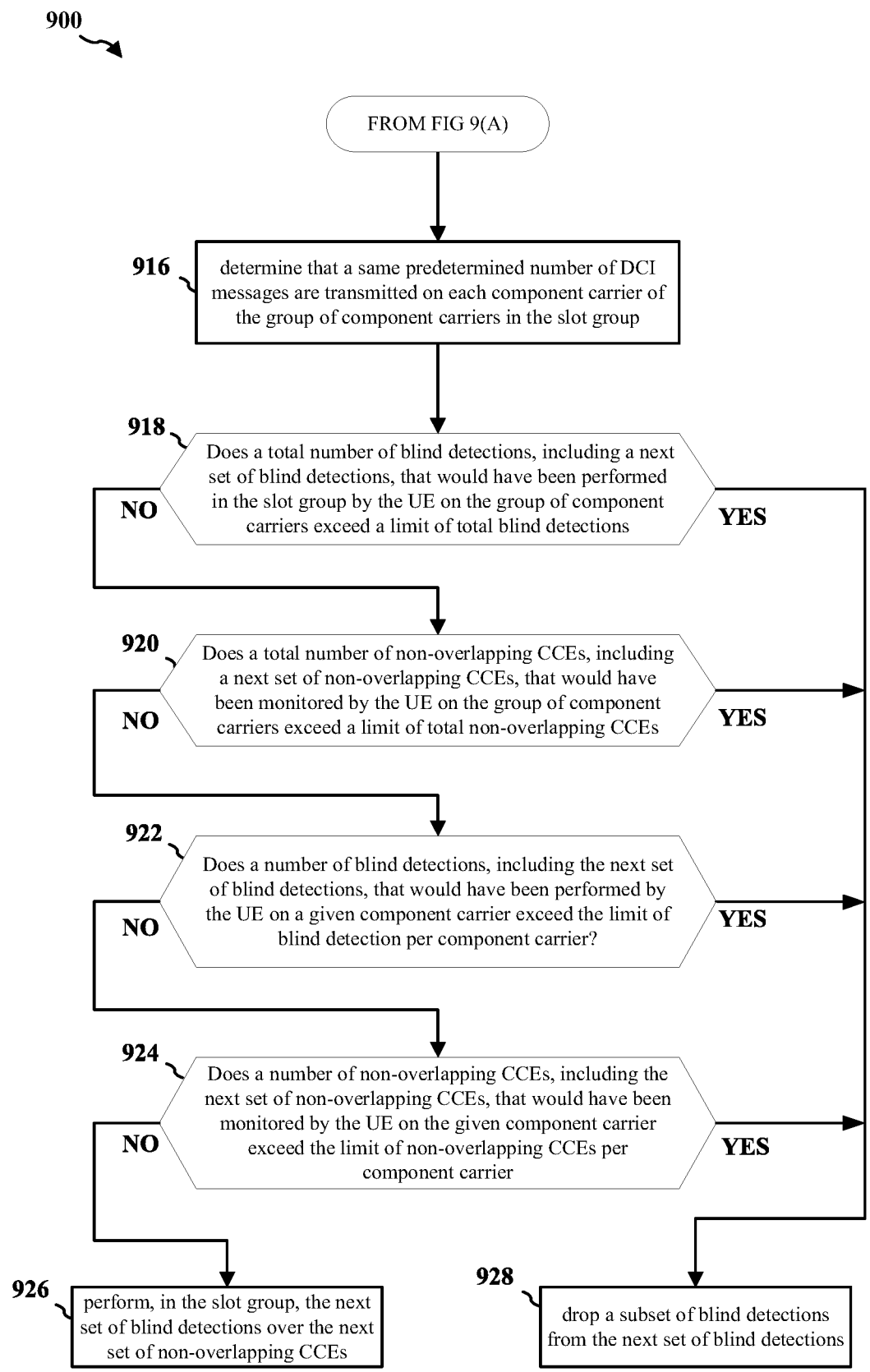

FIGS. 9(A) and 9(B) are a flow chart 900 of a method (process) for performing blind detections. The method may be performed by a UE (e.g., the UE 704). At operation 902, the UE allocates a slot group including a number of consecutive slots based on an operating subcarrier spacing. A start boundary and an end boundary of the slot group each align with a boundary of a slot using a reference subcarrier spacing. At operation 904, the UE receives a configuration allocating blind detections over non-overlapping CCEs in the slot group among a group of component carriers of the UE using the operating subcarrier spacing.

At operation 906, the UE determines a first number of component carriers that is a maximum number configured for the UE in carrier aggregation. At operation 908, the UE determines a second number of component carriers that have been scheduled between the base station and the UE. At operation 910, the UE determines a limit of blind detection per component carrier using the operating subcarrier spacing for the UE to perform blind detections. At operation 912, the UE determines a limit of non-overlapping CCEs per component carrier using the operating subcarrier spacing in the slot group to be monitored by the UE. At operation 914, the UE determines the limit of total blind detections and the limit of total non-overlapping CCEs associated with the operating subcarrier spacing based on the first number and the second number.

At operation 916, the UE determines that a same predetermined number of DCI messages are transmitted on each component carrier of the group of component carriers in the slot group. At operation 918, the UE determines whether a total number of blind detections, including a next set of blind detections, that would have been performed in the slot group by the UE on the group of component carriers exceeds a limit of total blind detections associated with the operating subcarrier spacing. When the total number of blind detections exceeds the limit of total blind detections, the UE enters operation 928. When the total number of blind detections does not exceed the limit of total blind detections, at operation 920, the UE determines whether a total number of non-overlapping CCEs, including a next set of non-overlapping CCEs, that would have been monitored by the UE on the group of component carriers exceeds a limit of total non-overlapping CCEs associated with the operating subcarrier spacing. When the total number of non-overlapping CCEs exceeds the limit of total non-overlapping CCEs, the UE enters operation 928.

When the total number of non-overlapping CCEs does not exceed the limit of total non-overlapping CCEs, at operation 922, the UE determines whether a number of blind detections, including the next set of blind detections, that would have been performed by the UE on a given component carrier exceeds the limit of blind detection per component carrier using the operating subcarrier spacing. When the number of blind detections exceeds the limit of blind detection per component carrier, the UE enters operation 928.

When the number of blind detections does not exceed the limit of blind detection per component carrier, at operation 924, the UE determines whether a number of non-overlapping CCEs, including the next set of non-overlapping CCEs, that would have been monitored by the UE on the given component carrier exceeds the limit of non-overlapping CCEs per component carrier. When the number of non-overlapping CCEs exceeds the limit, the UE enters operation 928.

When the number of non-overlapping CCEs does not exceed the limit, at operation 926, the UE performs, in the slot group, the next set of blind detections over the next set of non-overlapping CCEs on the given component carrier of the group of component carriers in accordance with the configuration. Further, after entering operation 928 as described supra, the UE drops a subset of blind detections from the next set of blind detections. In addition, the operations 918, 920, 922, 924 may be performed in any order. FIG. 9(B) only shows an exemplary order of those operations being performed.

In certain configurations, the start boundary of the slot group aligns with a start boundary of a reference slot using the reference subcarrier spacing and the end boundary of the slot group aligns with an end boundary of the reference slot. In certain configurations, the same slot group is allocated on each component carrier of the group of component carriers. In certain configurations, the number of blind detections have been performed to decode the DCI messages.

Figure 10:
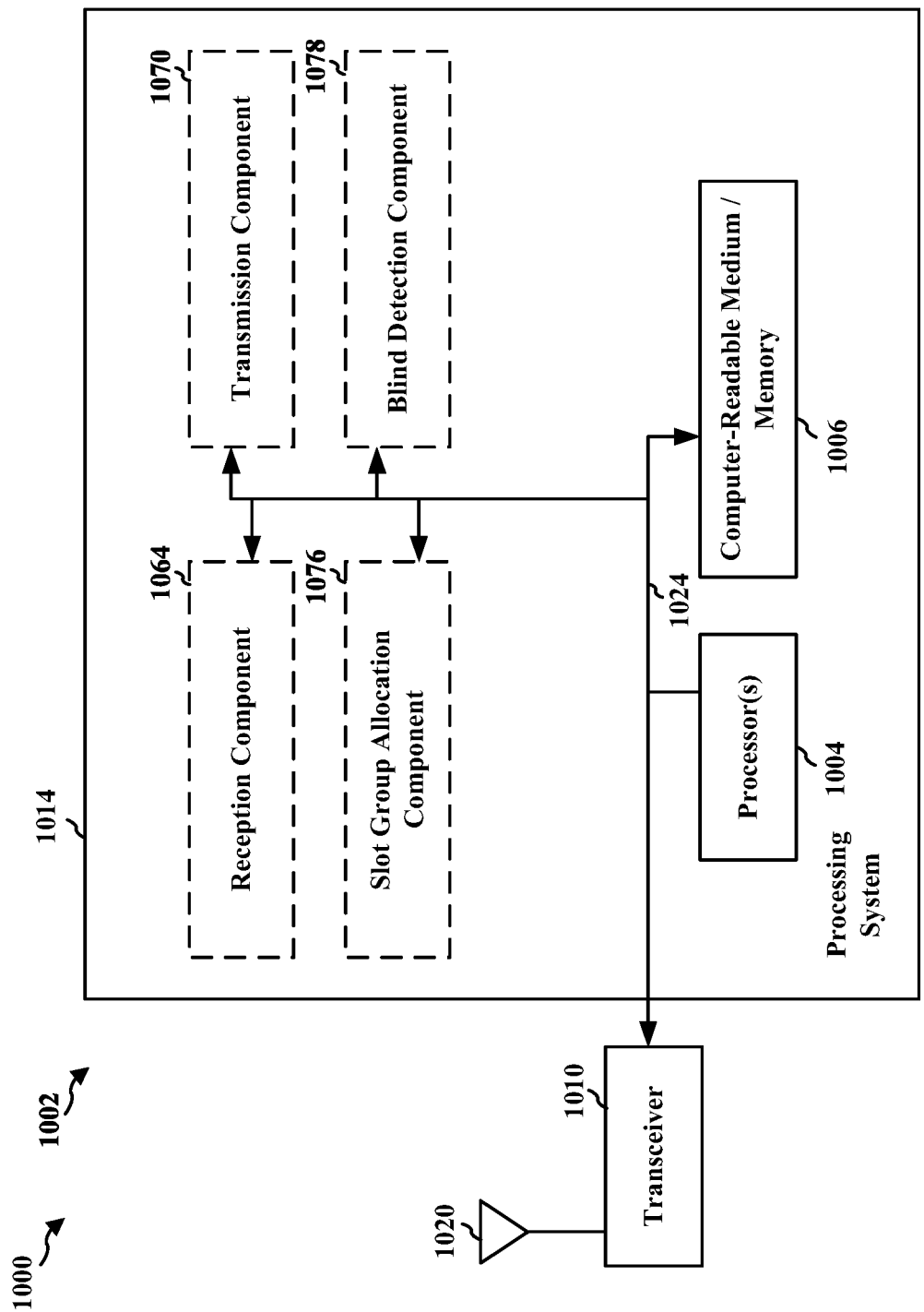
FIG. 10 is a diagram illustrating an example of a hardware implementation for an apparatus employing a processing system.

FIG. 10 is a diagram 1000 illustrating an example of a hardware implementation for an apparatus 1002 employing a processing system 1014. The apparatus 1002 may be a base station. The processing system 1014 may be implemented with a bus architecture, represented generally by a bus 1024. The bus 1024 may include any number of interconnecting buses and bridges depending on the specific application of the processing system 1014 and the overall design constraints. The bus 1024 links together various circuits including one or more processors and/or hardware components, represented by one or more processors 1004, a reception component 1064, a transmission component 1070, a slot group allocation component 1076, and a blind detection component 1078, and a computer-readable medium/memory 1006. The bus 1024 may also link various other circuits such as timing sources, peripherals, voltage regulators, and power management circuits, etc.

The processing system 1014 may be coupled to a transceiver 1010, which may be one or more of the transceivers 254. The transceiver 1010 is coupled to one or more antennas 1020, which may be the communication antennas 220.

The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 1064. In addition, the transceiver 1010 receives information from the processing system 1014, specifically the transmission component 1070, and based on the received information, generates a signal to be applied to the one or more antennas 1020.

The processing system 1014 includes one or more processors 1004 coupled to a computer-readable medium/memory 1006. The one or more processors 1004 are responsible for general processing, including the execution of software stored on the computer-readable medium/memory 1006. The software, when executed by the one or more processors 1004, causes the processing system 1014 to perform the various functions described supra for any particular apparatus. The computer-readable medium/memory 1006 may also be used for storing data that is manipulated by the one or more processors 1004 when executing software. The processing system 1014 further includes at least one of the reception component 1064, the transmission component 1070, the blind detection component 1078, and the slot group allocation component 1076. The components may be software components running in the one or more processors 1004, resident/stored in the computer readable medium/memory 1006, one or more hardware components coupled to the one or more processors 1004, or some combination thereof. The processing system 1014 may be a component of the base station 210 and may include the memory 276 and/or at least one of the TX processor 216, the RX processor 270, and the controller/processor 275.

In one configuration, the apparatus 1002 for wireless communication includes means for performing each of the operations of FIG. 8. The aforementioned means may be one or more of the aforementioned components of the apparatus 1002 and/or the processing system 1014 of the apparatus 1002 configured to perform the functions recited by the aforementioned means.

As described supra, the processing system 1014 may include the TX Processor 216, the RX Processor 270, and the controller/processor 275. As such, in one configuration, the aforementioned means may be the TX Processor 216, the RX Processor 270, and the controller/processor 275 configured to perform the functions recited by the aforementioned means.

FIG X2

Figure 11:
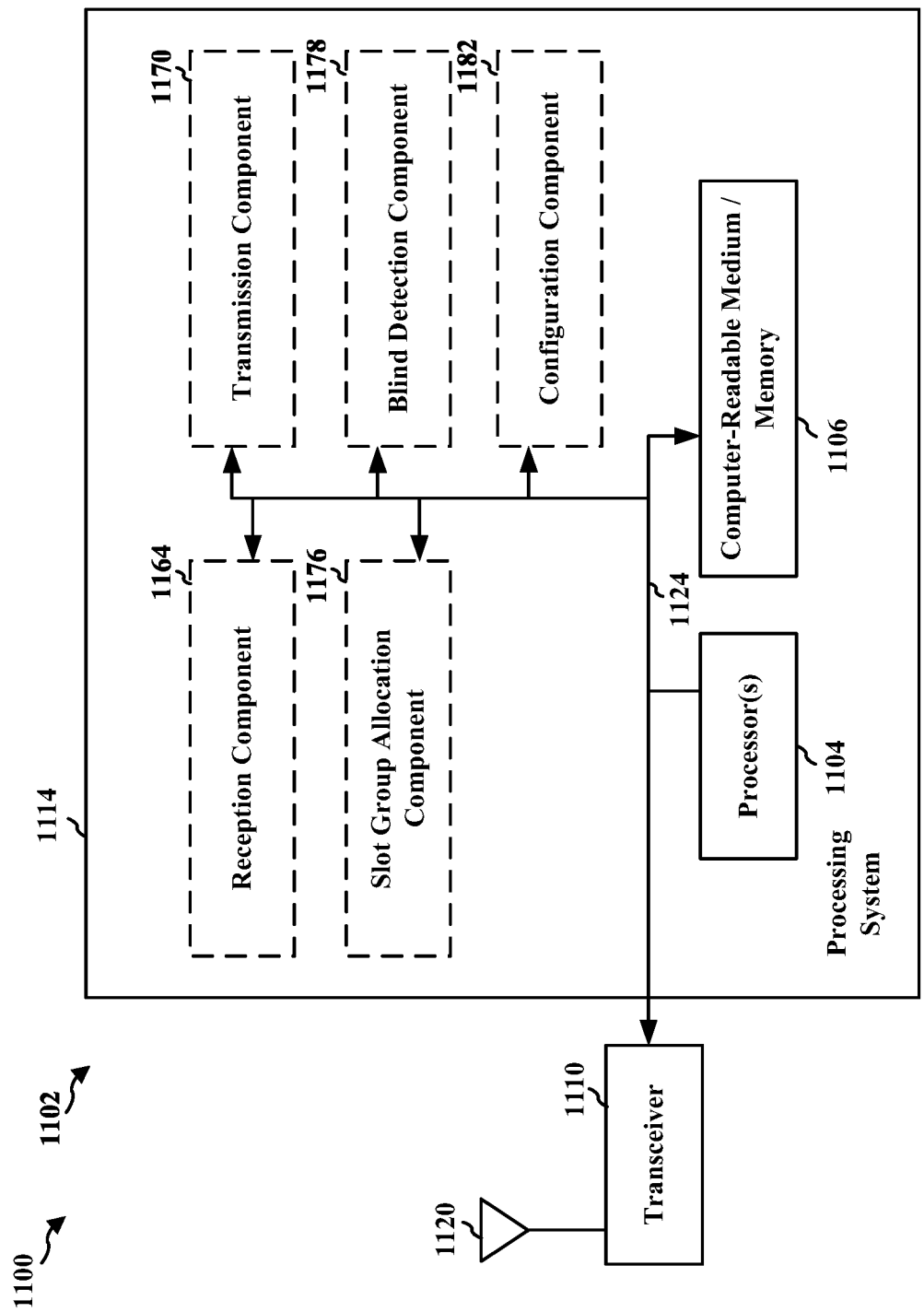
FIG. 11 is a diagram illustrating an example of a hardware implementation for another apparatus employing a processing system.

FIG. 11 is a diagram 1100 illustrating an example of a hardware implementation for an apparatus 1102 employing a processing system 1114. The apparatus 1102 may be a UE. The processing system 1114 may be implemented with a bus architecture, represented generally by a bus 1124. The bus 1124 may include any number of interconnecting buses and bridges depending on the specific application of the processing system 1114 and the overall design constraints. The bus 1124 links together various circuits including one or more processors and/or hardware components, represented by one or more processors 1104, a reception component 1164, a transmission component 1170, a compensation component 1178, a measurement component 1176, a configuration component 1182, and a computer-readable medium/memory 1106. The bus 1124 may also link various other circuits such as timing sources, peripherals, voltage regulators, and power management circuits, etc.

The processing system 1114 may be coupled to a transceiver 1110, which may be one or more of the transceivers 254. The transceiver 1110 is coupled to one or more antennas 1120, which may be the communication antennas 252.

The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1164. In addition, the transceiver 1110 receives information from the processing system 1114, specifically the transmission component 1170, and based on the received information, generates a signal to be applied to the one or more antennas 1120.

The processing system 1114 includes one or more processors 1104 coupled to a computer-readable medium/memory 1106. The one or more processors 1104 are responsible for general processing, including the execution of software stored on the computer-readable medium/memory 1106. The software, when executed by the one or more processors 1104, causes the processing system 1114 to perform the various functions described supra for any particular apparatus. The computer-readable medium/memory 1106 may also be used for storing data that is manipulated by the one or more processors 1104 when executing software. The processing system 1114 further includes at least one of the reception component 1164, the transmission component 1170, the compensation component 1178, the measurement component 1176, and the configuration component 1182. The components may be software components running in the one or more processors 1104, resident/stored in the computer readable medium/memory 1106, one or more hardware components coupled to the one or more processors 1104, or some combination thereof. The processing system 1114 may be a component of the UE 250 and may include the memory 260 and/or at least one of the TX processor 268, the RX processor 256, and the communication processor 259.

In one configuration, the apparatus 1102 for wireless communication includes means for performing each of the operations of FIGS. 9(A) and 9(B). The aforementioned means may be one or more of the aforementioned components of the apparatus 1102 and/or the processing system 1114 of the apparatus 1102 configured to perform the functions recited by the aforementioned means.

As described supra, the processing system 1114 may include the TX Processor 268, the RX Processor 256, and the communication processor 259. As such, in one configuration, the aforementioned means may be the TX Processor 268, the RX Processor 256, and the communication processor 259 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a base station, comprising:
   allocating a slot group including a number of consecutive slots based on an operating subcarrier spacing, wherein a start boundary and an end boundary of the slot group each align with a boundary of a slot using a reference subcarrier spacing;
   determining a limit of total blind detections in the slot group to be performed by a user equipment (UE) and a limit of total non-overlapping control-channel elements (CCEs) being monitored by the UE, both associated with the operating subcarrier spacing; and
   transmitting a configuration allocating P blind detections over M non-overlapping CCEs in the slot group among a group of component carriers of the UE using the operating subcarrier spacing, P being an integer not greater than the limit of total blind detections, M being an integer not greater than the limit of total non-overlapping CCEs.

2. The method of claim 1, wherein the start boundary of the slot group aligns with a start boundary of a reference slot using the reference subcarrier spacing and the end boundary of the slot group aligns with an end boundary of the reference slot.

3. The method of claim 1, wherein a same slot group is allocated on each component carrier of the group of component carriers.

4. The method of claim 1, further comprising:
   determining a first number of component carriers that is a maximum number of component carriers configured for the UE in carrier aggregation; and
   determining a second number of component carriers have been scheduled between the base station and the UE, wherein the limit of total blind detections associated with the operating subcarrier spacing is determined based on the first number and the second number.

5. The method of claim 1, further comprising:
   determining a limit of blind detection per component carrier using the operating subcarrier spacing for the UE to perform blind detections, wherein the P blind detections in the slot group are allocated among the group of component carriers based on the limit of total blind detections and the limit of blind detection per component carrier using the operating subcarrier spacing.

6. The method of claim 1, further comprising:
   determining a limit of non-overlapping CCEs per component carrier using the operating subcarrier spacing for the UE to perform blind detections, wherein the M non-overlapping CCEs in the slot group are allocated among the group of component carriers based on the limit of total non-overlapping CCEs and the limit of non-overlapping CCEs per component carrier using the operating subcarrier spacing.

7. The method of claim 1, further comprising:
   configuring a same predetermined number of downlink control information (DCI) messages in the slot group on each component carrier of the group of component carriers.

8. A method of wireless communication of a user equipment (UE), comprising:
   allocating a slot group including a number of consecutive slots based on an operating subcarrier spacing, wherein a start boundary and an end boundary of the slot group each align with a boundary of a slot using a reference subcarrier spacing;
   receiving a configuration allocating blind detections over non-overlapping control-channel elements (CCEs) in the slot group among a group of component carriers of the UE using the operating subcarrier spacing; and performing, in the slot group, a next set of blind detections over a next set of non-overlapping CCEs on a given component carrier of the group of component carriers in accordance with the configuration, when (a) a total number of blind detections, including the next set of blind detections, that would have been performed in the slot group by the UE on the group of component carriers does not exceed a limit of total blind detections associated with the operating subcarrier spacing and (b) a total number of non-overlapping CCEs, including the next set of non-overlapping CCEs, that would have been monitored in the slot group by the UE on the group of component carriers does not exceed a limit of total non-overlapping CCEs associated with the operating subcarrier spacing.

9. The method of claim 8, further comprising:
dropping a subset of blind detections from the next set of blind detections, when the total number of blind detections that would have been performed by the UE exceeds the limit of total blind detections or the total number of non-overlapping CCEs that would have been monitored by the UE exceeds the limit of total non-overlapping CCEs.

10. The method of claim 8, further comprising:
determining a first number of component carriers that is a maximum number configured for the UE in carrier aggregation;
determining a second number of component carriers that have been scheduled between a base station and the UE; and
determining the limit of total blind detections and the limit of total non-overlapping CCEs associated with the operating subcarrier spacing based on the first number and the second number.

11. The method of claim 8, further comprising:
determining a limit of blind detection per component carrier using the operating subcarrier spacing for the UE to perform blind detections, wherein the next set of blind detections in the slot group is performed further based on that a number of blind detections, including the next set of blind detections, that would have been performed by the UE on the given component carrier does not exceed the limit of blind detection per component carrier using the operating subcarrier spacing.

12. The method of claim 8, further comprising:
determining a limit of non-overlapping CCEs per component carrier using the operating subcarrier spacing in the slot group to be monitored by the UE, wherein the next set of blind detections in the slot group is performed further based on that a number of non-overlapping CCEs, including the next set of non-overlapping CCEs, that would have been monitored by the UE on the given component carrier does not exceed the limit of non-overlapping CCEs per component carrier.

13. The method of claim 8, wherein the start boundary of the slot group aligns with a start boundary of a reference slot using the reference subcarrier spacing and the end boundary of the slot group aligns with an end boundary of the reference slot.

14. The method of claim 8, wherein the same slot group is allocated on each component carrier of the group of component carriers.

15. The method of claim 8, further comprising:
determining that a same predetermined number of downlink control information (DCI) messages are transmitted on each component carrier of the group of component carriers in the slot group, wherein the number of blind detections have been performed to decode the DCI messages.

16. An apparatus for wireless communication, the apparatus being a user equipment (UE), comprising:
a memory; and
at least one processor coupled to the memory and configured to:
allocate a slot group including a number of consecutive slots based on an operating subcarrier spacing, wherein a start boundary and an end boundary of the slot group each align with a boundary of a slot using a reference subcarrier spacing;
receive a configuration allocating blind detections over control-channel elements (CCEs) in the slot group among a group of component carriers of the UE using the operating subcarrier spacing; and
perform, in the slot group, a next set of blind detections over a next set of non-overlapping CCEs on a given component carrier of the group of component carriers in accordance with the configuration, when (a) a total number of blind detections, including the next set of blind detections, that would have been performed in the slot group by the UE on the group of component carriers does not exceed a limit of total blind detections associated with the operating subcarrier spacing and (b) a total number of non-overlapping CCEs, including the next set of non-overlapping CCEs, that would have been monitored by the UE on the group of component carriers does not exceed a limit of total non-overlapping CCEs associated with the operating subcarrier spacing.

17. The apparatus of claim 16, further comprising:
drop a subset of blind detections from the next set of blind detections, when the total number of blind detections that would have been performed by the UE on the group of component carriers in the slot group exceeds the limit of total blind detections or the total number of non-overlapping CCEs that would have been monitored by the UE on the group of component carriers in the slot group exceeds the limit of total non-overlapping CCEs.

18. The apparatus of claim 16, further comprising:
determine a first number of component carriers that is a maximum number configured for the UE in carrier aggregation;
determine a second number of component carriers have been scheduled between a base station and the UE; and
determining the limit of total blind detections and the limit of total non-overlapping CCEs associated with the operating subcarrier spacing based on the first number and the second number.

19. The apparatus of claim 16, further comprising:
determine a limit of blind detection per component carrier using the operating subcarrier spacing for the UE to perform blind detections, wherein the next set of blind detections in the slot group is performed further based on that a number of blind detections, including the next set of blind detections, that would have been performed by the UE on the given component carrier does not exceed the limit of blind detection per component carrier using the operating subcarrier spacing.

20. The apparatus of claim 16, further comprising:
determine a limit of non-overlapping CCEs per component carrier using the operating subcarrier spacing in the slot group to be monitored by the UE, wherein the next set of blind detection sin the slot group is performed further based on that a number of non-overlapping CCEs, including the next set of non-overlapping CCEs, that would have been monitored by the UE on the given component carrier does not exceed the limit of non-overlapping CCEs per component carrier.

* * * * *